United States Patent
Tang

(10) Patent No.: US 12,359,443 B2
(45) Date of Patent: Jul. 15, 2025

(54) SUBSTRATE FOR DIGITAL PRINTING, DIGITAL PRINT PLANK AND METHOD FOR PREPARING SAME

(71) Applicant: ANHUI SENTAI WPC-TEC FLOORING CO., LTD., Anhui (CN)

(72) Inventor: Daoyuan Tang, Xuancheng (CN)

(73) Assignee: ANHUI SENTAI WPC-TEC FLOORING CO., LTD., Anhui (CN)

( * ) Notice: Subject to any disclaimer, the term of this patent is extended or adjusted under 35 U.S.C. 154(b) by 0 days.

(21) Appl. No.: 17/620,740

(22) PCT Filed: Dec. 3, 2021

(86) PCT No.: PCT/CN2021/135326
§ 371 (c)(1),
(2) Date: Dec. 20, 2021

(87) PCT Pub. No.: WO2023/092634
PCT Pub. Date: Jun. 1, 2023

(65) Prior Publication Data
US 2024/0044149 A1 Feb. 8, 2024

(30) Foreign Application Priority Data
Nov. 26, 2021 (CN) .......................... 202111419020.9

(51) Int. Cl.
*E04F 15/02* (2006.01)
*B41J 11/00* (2006.01)

(52) U.S. Cl.
CPC ......... *E04F 15/02* (2013.01); *B41J 11/00214* (2021.01); *B32B 2419/04* (2013.01); *Y10T 428/16* (2015.01)

(58) Field of Classification Search
None
See application file for complete search history.

(56) References Cited

FOREIGN PATENT DOCUMENTS

| CN | 105428257 A | * | 3/2016 | |
|---|---|---|---|---|
| CN | 111379396 A | * | 7/2020 | |
| CN | 112693184 A | * | 4/2021 | ............ A41D 31/02 |

* cited by examiner

*Primary Examiner* — Farah Taufiq
(74) *Attorney, Agent, or Firm* — Olive Law Group, PLLC

(57) ABSTRACT

Embodiments provide a substrate for digital printing, a digital print plank obtained based on the substrate, and a method for preparing the digital print plank. In the embodiments, an intermediate structure layer formed of wood plastic or stone plastic is obtained through die extrusion, then an elastic stress layer composed of hot-melt resin is co-extruded or bonded online on the base surface of the intermediate structure layer to obtain the substrate for digital printing; then a pattern simulate layer with a pattern and 3D effect is combined on the decorative surface of the substrate, that is, the digital print plank is obtained.

3 Claims, No Drawings

SUBSTRATE FOR DIGITAL PRINTING, DIGITAL PRINT PLANK AND METHOD FOR PREPARING SAME

TECHNICAL FIELD

The present disclosure relates to the technical field of 3D printing planks, in particular to a substrate for digital printing, a digital print plank and a method for preparing the plank.

BACKGROUND

The floor is often used during ground decoration. In order to improve the appearance level of ground decoration, solid wood flooring is usually the first option for high-class decoration, and the wooden texture and pattern formed can improve the visual beauty. However, solid wood flooring has high requirements for wood quality, high prices, and high maintenance costs, for example, paving and use will bring greater economic expenses. In order to reduce costs, people adopt a method of attaching a wood grain layer to the surface of a lower-cost substrate layer. The substrate layer is usually made of wood-plastic, stone-plastic and other materials that are easy to process and low in cost. However, the wood texture formed by this method is a 2D structure, and the visual effect is quite different from that of solid wood.

The patent document with the Publication No.: WO2020/039361A1 discloses a method and apparatus for generating a superficial structure on a substrate, comprising the steps of: A) applying a resin A on the surface of a material (substrate); B) applying a liquid B on at least one portion of the resin A, when the resin A is liquid or it is partially cured; C) polymerizing, also separately, the resin A and the liquid B; D) removing the polymerized liquid B.

The patent document with the Publication No.: CN109653465A discloses a PVC decorative plank with 3D effect and a 3D printing production method thereof, comprising the steps of: cleaning a PVC plank substrate; coating the surface of the PVC plank substrate with UV primer, drying and curing the UV primer; curing and drying UV white paint; printing, by a flatbed inkjet printer, patterns to prepare semi-finished products; coating UV wear-resistant paint; drying UV; printing, by the flatbed ink jet printer, concave-convex effect layer to prepare a semi-finished plank; then, irradiating and curing by a mercury UV lamp; applying UV finish coating; drying and curing UV, and irradiating and curing by the mercury UV lamp. A non-solid wood flooring with 3D textures on the surface can be obtained by adopting the above technical solutions.

For floors with 2D textures, the production process is usually as shown in the patent document with No.: CN201910924942.1. The patent document discloses an SPC impregnated paper floor and a method for forming the same. The SPC impregnated paper floor includes a wear-resistant layer, a decorative layer, a base layer and balance layer from top to bottom. The forming method comprise the steps of: applying glue on the top and bottom of the base layer, then pasting the decorative layer and balance layer on the top and bottom of the base layer in turn, and finally forming the wear-resistant layer on the surface of the decorative layer. The above-mentioned floor structure is generally formed by sequentially hot pressing each layer by pressing rollers, and using hot pressing to release the stress between the layers to obtain a flat floor. For 3D printing planks, an internal stress will be generated between 3D effect layer and the substrate formed during the production process, such that the edge of the substrate will be warped to the side of the 3D effect layer. However, 3D printing plank cannot be hot-pressed like a 2D textured plank to eliminate stress and reduce warpage, because once hot-pressed, the uneven 3D effect area will be deformed, causing the shape of the 3D pattern to deform or disappear.

SUMMARY

In order to solve the above problems, in a first aspect, the present disclosure is intended to provide a substrate for digital printing.

A substrate for digital printing comprises a structure layer mainly composed of a mixture of a hot-melt first resin and a filler, and an elastic stress layer that is compositely formed with a base surface of the structure layer and is mainly composed of a hot-melt second resin;

the structure layer and the elastic stress layer infiltrate each other at an interface to form a blended layer mainly composed of the first resin, the second resin and the filler;

a greater thermal shrinkage rate of the elastic stress layer is greater than that of the structure layer, and a thickness of the elastic stress layer is less than ⅕ of a thickness of the structure layer.

In a second aspect, the present disclosure is intended to provide a digital print plank formed on the basis of the above-mentioned substrate.

A digital print plank comprising:

an intermediate structure layer mainly composed of a mixture of a hot-melt first resin and a filler;

an elastic stress layer that is compositely formed with a base surface of the intermediate structure layer and is mainly composed of a hot-melt second resin; and a pattern simulate layer that is compositely formed with a decorative surface of the intermediate structure layer and is mainly composed of a third resin;

the intermediate structure layer and the elastic stress layer infiltrate each other at an interface to form a blended layer mainly composed of the first resin, the second resin and the filler;

the pattern simulate layer is formed with an uneven 3D pattern structure in a surface;

a thermal shrinkage rate of the elastic stress layer is greater than that of the intermediate structure layer, each thickness of the elastic stress layer and the pattern simulate layer is less than ⅕ of a thickness of the intermediate structure layer.

The main difference between the technical solution of the present disclosure and the prior art is that an elastic stress layer is compositely formed on the base surface of the structure layer of the substrate or the intermediate structure layer of the plank, and a blended layer composed of the hot-melt first resin, the hot-melt second resin and the filler is formed at the interface between the elastic stress layer and the structure layer/intermediate structure layer. The thermal shrinkage rate of the elastic stress layer is greater than that of the structure layer/intermediate structure layer. The thermal shrinkage rate in the present disclosure refers to the percentage of the difference between the size of a hot-melt resin or a mixture of hot-melt resin and other materials in the state of melt processing and the size after cooling to room temperature. Taking an embodiment of the present disclosure as an example, the PVC resin, plasticizer, heavy calcium and other additives are mixed and processed by an extruder and a mold to form a first layered body, the thermal shrinkage rate is the percentage of the difference between the size at the time the first layered body has not yet been cooled in the mold runner and the size of the first layered body after being extruded and cooled from the mold.

The above-mentioned mixed filler is usually a powdery material that is cheaper than the second resin. Since the intermediate structure layer formed by the second resin needs to constitute the main structure of the substrate, the thickness is large and the amount of raw materials used is large. It will greatly increase the cost and reduce market competitiveness if the formation is completed by wholly adopting the second resin. Generally speaking, there are two types of materials that are more common and cheaper in this field. The first type is represented by mineral powders such as heavy calcium and wollastonite. These mineral powders usually have a higher density (density can reach 2.4~3 $g/m^3$). After mixing with the second resin, an intermediate structure layer with high-density will be obtained. This type of product is usually called "stone plastic". The second type is represented by wood fiber powder such as bamboo powder and wood powder. These wood fiber powders and the second resin can be mixed and formed to obtain a texture and color relatively close to wood, and their own weight is usually light. Such products are usually called "wood plastic". The above-mentioned stone-plastic products may contain one or more mineral powders, and wood-plastic products may also contain one or more wood fiber powders from a variety of sources. Obviously, in the process of producing stone plastic or wood plastic, in addition to the second resin and mineral powder or wood fiber powder, some additives, such as antioxidants, coupling agents, lubricants and the like need to be added. Additives are commonly used methods in this field, so it will not be repeated in the present disclosure.

The above-mentioned hot-melt resin refers to a type of resin that can convert the resin from a solid state to a viscous state by increasing the temperature, and then restore the solid state after lowering the temperature. The most common ones are polyvinyl chloride resins and polyolefin resins, and the like.

Whether it is the above-mentioned stone plastic or wood plastic, the thermal shrinkage rate of the added mixed filler is significantly lower than that of the hot-melt resin, because the polymer chain of the hot-melt resin material will change and cause volume change after the temperature is affected. For wood fiber powder and mineral powder, especially mineral powder, the volume is basically not affected by temperature. In addition, after adding mineral powder or wood fiber powder, the toughness of the intermediate structure layer will also be significantly lower than that of the second resin. In the prior art, in the 3D printing process, it is usually necessary to apply a fluidized resin A on the decorative surface of the intermediate structure layer, and it is generally preferable that the resin A is a photo-polymerizable resin. Then resin A will be gradually cured and formed, and the curing and forming process is usually accompanied by volume shrinkage. When resin A shrinks, it will cause internal stress that shrinks to the middle between resin A and the intermediate structure layer. When the internal stress is large, the edge of the intermediate structure layer will warp towards the decorative surface. Due to the poor toughness of the intermediate structure layer, when the warpage reaches a certain level, it will also cause the intermediate structure layer to crack.

In order to make the 3D effect more prominent, usually a 2D pattern layer is formed on the substrate first, and then a 3D effect layer is formed on the 2D pattern layer. If so, the above-mentioned pattern simulate layer of the present disclosure includes the 2D pattern layer and the 3D effect layer.

When forming a 2D pattern layer, it is often necessary to coat a multi-layer structure on the decorative surface of the intermediate structure layer. The accumulation of the internal stress of the multi-layer structure will make the total internal stress of the pattern simulate layer reach a higher level. The probability of warping of the intermediate structure layer is greatly increased, and it is even more necessary to solve the warpage problem of the product.

The method of the present disclosure to solve the above problems lies in the arrangement of the elastic stress layer. When the pattern simulate layer shrinks, the elastic stress layer will shrink simultaneously. The difference is that the pattern simulate layer causes the edge of the intermediate structure layer tending to warp in the direction of the decorative surface, and the elastic stress layer causes the intermediate structure layer tending to warp toward the base surface. The two trends can be offset, and the intermediate structure layer can remain flat. At the same time, due to the presence of the blended layer, the elastic stress layer will not delaminate with the intermediate structure layer. From a production perspective, in order to avoid damage to the intermediate structure layer due to the excessive stress of the elastic stress layer and the pattern simulate layer, the thickness of the elastic stress layer and the pattern simulate layer are both less than ⅕ of the thickness of the intermediate structure layer. Due to the presence of the blended layer, the elastic stress layer and the intermediate structure layer can be regarded as an integrated structure. From the intermediate structure layer to the blended layer, and to the elastic stress layer, the composition thereof are not abrupt, but gradually changes, so no additional adhesive is required between the elastic stress layer and the intermediate structure layer.

Both the first resin and the second resin can be composed of a single resin, or can be formed by a mixture of a plurality of resins. In the present disclosure, the processing temperature and glass transition temperature of the first resin and the second resin can be close and have good compatibility, so as to form a blended layer. Therefore, preferably, the first resin is composed of one or more hot-melt resins, and the second resin is composed of one or more hot-melt resins; the first resin includes an intermediate structure layer bonding resin, the second resin includes at least an elastic stress layer bonding resin that is composed of one monomer and same as the intermediate structure layer bonding resin.

When the same type of bonding resin exists in the first resin and the second resin, they will have better compatibility to form mutual penetration, and finally the blended layer can be formed and ensured to have a certain thickness, for example, polyvinyl chloride is contained in both the first resin and the second resin. It should be noted that although the intermediate structure layer bonding resin and the elastic stress layer bonding resin have the same constituent monomers, their polymerization degree and other characteristics are not necessarily the same. For example, the elastic stress layer can use a resin with a relatively high degree of polymerization, to increase its physical strength to obtain abrasion resistance, scratch resistance, bending resistance and other properties. In addition, the arrangement of the elastic stress layer also has the following effects: since the elastic stress layer is made of resin material, the moisture-proof and waterproof performance of the base surface of the plank will be enhanced; the elasticity of the elastic stress layer is higher than the intermediate structure layer composed of wood plastic or stone plastic. The elastic cushioning effect can enhance its compressive resistance during use and improve the toughness of the plank. When the plank is dropped from a high position, the elastic stress layer can prevent the intermediate substrate layer that lacks toughness from being impacted and broken when it is dropped to the ground.

In a third aspect, the present disclosure is intended to provide a method for preparing the above-mentioned digital print plank. The main steps of the method are as follows:

S1, mixing and heating a hot-melt first resin with a filler to form a first melt, and importing the first melt into a mold to form a first layered body;

S2, heating a hot-melt second resin to form a second melt, and importing the second melt into the mold; applying the second melt to a base surface of the first melt to form an elastic stress layer when the first layered body formed by the first melt is not completely cooled and cured, such that the first layered body and a second layered body can infiltrate each other at an interface to form a blended layer, and the substrate composed of the intermediate structure layer formed by the first layered body, the elastic stress layer formed by the second layered body, and the blended layer can be obtained;

S3, exporting, cooling and shaping the substrate from the mold; forming, by a first print device, a pattern on a decorative surface of the intermediate structure layer to obtain a first print substrate;

S4, applying a non-solid third resin composition to a decorative surface of the first print substrate to form a pattern simulate layer precursor; where the non-solid third resin composition is a third melt containing the third resin in a hot melt state, or the non-solid third resin composition is a mixed liquid containing a prepolymer that can be cross-linked to form a third resin, a monomer, and an initiator;

S5, applying, by a second print device, a surface treating liquid to the pattern simulate layer precursor, and then curing the pattern simulate layer precursor by cooling or cross-linking polymerization to form a pattern simulate layer, and removing the surface treating liquid, such that an uneven second print substrate with a 3D pattern structure on the surface can be obtained, wherein the second print substrate is a digital print plank.

The above steps S1 and S2 are the method for preparing the substrate for digital printing.

In the 3D printing process, a third resin composition needs to be applied to the decorative surface of the intermediate structure layer. The third resin composition may be a third melt formed by the third resin, and the third melt will form a pattern simulate layer after cooled and cured. The third resin composition can also be a mixed liquid containing a prepolymer that can be cross-linked to form the third resin, a monomer, and an initiator. The prepolymer and the monomer are polymerized under the action of the initiator, and finally form a solid pattern simulate layer. In order to facilitate processing, it is generally preferred that the third resin composition is a mixed liquid of a prepolymer that can be cross-linked to form the third resin, a monomer and an initiator. Further preferably, the third resin is a photocrosslinked resin, so that the polymerization conditions of prepolymers and monomers are more gentle and controllable. When the third resin composition is a mixed liquid containing a prepolymer that can be cross-linked to form the third resin, monomers and initiators, as the polymerization progresses, the third resin composition gradually changes from liquid to solid. Usually, the process of polymerizing monomers and prepolymers to obtain polymers is accompanied by volume shrinkage, and volume shrinkage will cause the internal stress to accumulate at the interface between the pattern simulate layer precursor and the intermediate structure layer, and finally the cured pattern simulate layer formed will cause the edge of the intermediate structure layer tending to warp toward the side of the decorative surface. In the preparation method of the present disclosure, the intermediate structure layer and the elastic stress layer have been obtained by co-extrusion. After they are co-extruded and compositely formed, the volume shrinkage rate of the intermediate structure layer during the cooling and curing process is small, while the elastic stress layer has a larger volume shrinkage rate than the intermediate structure layer. So after cooling and shaping, the intermediate structure layer will be subjected to the stress of the elastic stress layer to form a warping trend toward the base surface. Then the substrate undergoes a 3D printing process, and the pattern simulate layer forms a warpage trend toward the decorative surface, the warpage trend produced by the elastic stress layer and the warpage trend produced by the pattern simulate layer are offset, and a flat digital print plank with a smaller warpage can be obtained.

In general 2D wood grain processing, hot pressing by using rollers will be adopted for producing. Under heat and pressure, the stress formed between the layers will be eliminated and released to a certain extent, so that the warpage of the final product is qualified. In some technical solutions, a balance layer is also provided on the reverse side of the floor, so that the substrate is subjected to two hot pressings. The first hot pressing is applied to the decorative surface of the substrate layer with color film, veneer and other structures. At this time, the substrate layer will be warped toward one side of the decorative surface under the stress, and then the second hot pressing is applied to the base surface of the substrate layer for fitting.

For 3D printing, it is obvious that the stress cannot be relieved by heating and rolling, otherwise the 3D concave-convex effect will be destroyed. During the 3D printing process, the substrate warping phenomenon occurs during the formation of the 3D pattern structure. Obviously, it is impossible to attach a balance layer to the back of the intermediate structure layer to prevent warping at the same time as 3D printing, because the providing of the balance layer also needs to be rolled, otherwise it will not be able to form a stable bond with the substrate. After discovering the above problems, the inventor adopted a solution: first, a substrate containing an elastic stress layer and an intermediate structure layer are prefabricated, so that the substrate has a tendency to warp toward the substrate surface in advance, and then 3D printing is performed on the substrate, and the pattern simulate layer is used to make the substrate formation warp toward the decorative surface to offset the elastic stress layer. This solution solves the problem that general measures cannot be used to avoid substrate warping during the 3D printing process. In addition, for 2D printing, even if the warpage occurs during the multi-layer lamination process, the warpage can be eliminated or reduced to an acceptable range through the subsequent secondary hot pressing process, because the 2D printing structure will not disappear and deform due to hot pressing. For 3D printing, once the warpage occurs in the 3D printing production process, the subsequent hot pressing cannot make the warpage disappear. Therefore, the formation of warpage can only be prevented during the 3D printing process. In the present disclosure, based on this problem, a prefabrication step of the substrate is proposed.

In a fourth aspect, the present disclosure is intended to provide another method for preparing the above-mentioned plank.

The main steps of the method are as follows:

S1, mixing and heating a hot-melt first resin with a filler to form a first melt, and importing the first melt into a mold to form a first layered body;

S2, transporting a prefabricated second layered body formed by a hot-melt second resin to a base surface of the first layered body, and hot-pressing on-line the first layered body and the second layered body when the first layered body formed by the first melt is not completely cooled and cured, such that the first layered body and the second layered body can infiltrate each other at an interface to form a blended layer, and the substrate composed of the intermediate structure layer formed by the first layered body, the elastic stress layer formed by the second layered body and the blended layer can be obtained;

S3, exporting, cooling and shaping the substrate from the mold; forming, by a first print device, a pattern on a decorative surface of the intermediate structure layer to obtain a first print substrate;

S4, applying a non-solid third resin composition to the decorative surface of the first print substrate to form a pattern simulate layer precursor; where the non-solid third resin composition is a third melt containing the third resin in a hot melt state, or the non-solid third resin composition is a mixed liquid containing a pre-polymer that can be cross-linked to form a third resin, a monomer, and an initiator;

S5, applying, by a second print device, a surface treating liquid to the pattern simulate layer precursor, and then curing the pattern simulate layer precursor by cooling or cross-linking polymerization to form a pattern simulate layer, and removing the surface treating liquid, such that a second print substrate with an uneven 3D pattern structure on the surface can be obtained, wherein the second print substrate is the digital print plank.

In the above solution of the present disclosure, the first layered body and the second layered body are not co-extruded. Instead, the first layered body and the second layered body are formed separately, and then the first layered body and the second layered body are hot pressed, to form a substrate composed of an intermediate structure layer formed by the first layered body, an elastic stress layer formed by the second layered body, and a blended layer.

Among them, the first layered body and the second layered body are hot pressed, preferably on-line hot pressed. On-line hot pressing means that after the first layered body is extruded from its production equipment, it has not yet been completely cooled and has enough residual temperature so that it does not need to be heated when it is compositely formed with the prefabricated second layered body. That is to say, the first layered body is compositely formed with the second layered body during the cooling process.

The hot pressing step is carried out before the 3D printing step, so it will not affect the printing process.

Since the digital print plank obtained by the present disclosure generally includes a three-layer structure of a pattern simulate layer, an intermediate structure layer and an elastic stress layer, it is necessary to consider the adhesion/bonding problem between them to prevent delamination. As mentioned above, in order to improve the bonding performance between the intermediate structure layer and the elastic stress layer, the processing temperature and glass transition temperature of the first resin and the second resin can be close and have good compatibility. When the same type of bonding resin exists, both of them will have good compatibility to form mutual penetration, and finally the blended layer can be formed and it is ensured that the blended layer has a certain thickness. For example, both the first resin and the second resin contain PVC.

In addition, it is also necessary to consider the bonding strength between the pattern simulate layer and the intermediate structure layer.

There are basically two ways to form the pattern simulate layer. The first one is formed by polymerization and curing of a mixed liquid containing a prepolymer that can be cross-linked to form a third resin, a monomer, and an initiator. In order to improve controllability and make the reaction conditions mild, more photo-polymerization is adopted. During the formation of the pattern simulate layer, the third resin is gradually synthesized on the decorative surface of the intermediate structure layer, and the third resin can form a dense fit with the surface micro-structure of the decorative surface during the synthesis process, so the resulting pattern simulate layer, generally, can naturally form a high-strength bond with the intermediate structure layer. Another way to obtain the pattern simulate layer is to melt the hot-melt third resin and apply it to the decorative surface and cure for a forming. In this formation method, the third resin needs to have good compatibility with the material of the intermediate structure layer, such that the third resin can be more firmly attached to the intermediate structure layer after cooling. Therefore, it is preferable that the third resin contains at least a pattern simulate layer bonding resin that is composed of one monomer and same as the intermediate structure layer bonding resin, to improve the adhesion of the third resin on the surface of the intermediate structure layer.

Further, after the second print substrate is obtained in step S5, a UV finish coating can be applied to the surface of the pattern simulate layer of the second print substrate, and the UV finish coating can be photo-cured to obtain the digital print plank with a surface protective layer.

In sum, the following beneficial effects can be achieved by applying the technical solution of the present disclosure:

1. The digital print plank provided by the present disclosure has a three-layer structure of a pattern simulate layer, an intermediate structure layer and an elastic stress layer. The intermediate structure layer is composed of a stone plastic or wood plastic material with low heat shrinkage, and the pattern simulate layer and the elastic stress layer are composed of a resin material with a relatively high thermal shrinkage rate. The elastic stress layer and the pattern simulate layer respectively form the opposite warping stress on the intermediate structure layer during the shrinking process, and the opposite warpage stress can offset and keep the intermediate structure layer flat.

2. The intermediate structure layer based on the digital print substrate provided by the present disclosure contains the intermediate structure layer bonding resin, the elastic stress layer contains the elastic stress layer resin, and the intermediate structure layer resin and the elastic stress layer resin may be composed of the same monomer, so that the intermediate structure layer and the elastic stress layer have high compatibility and can form a blended layer with a certain thickness, and the bonding strength between the intermediate structure layer and the elastic stress layer can be enhanced.

3. The elastic stress layer of the digital print substrate provided by the present disclosure can improve the wear resistance and scratch resistance of the base surface of the digital print substrate and the waterproof performance of the base surface, making the substrate more durable; in addition, due to the toughness of the intermediate structure layer is low, so it is easy to break under impact. The elastic stress layer also plays a role in enhancing the impact resistance and prevents the plank from chipping; in addition, the elastic stress layer also has the effect of improving toughness to enhance the bending strength of the floor.

4. In the present disclosure, the elastic stress layer and the intermediate substrate layer are first prepared by co-extrusion or on-line pressing to prepare the substrate, and then the substrate is subjected to 3D printing treatment. The quality of the product is improved by preventing the occurrence of warpage, rather than correcting the product through secondary processing after the product has warped, the product quality is guaranteed without adding too many additional processes.

DESCRIPTION OF EMBODIMENTS

The following examples further illustrate the preferred embodiments of the present disclosure.

Example 1 (Ex. 1)

A method for preparing a digital print plank may include the following steps:
S1, mixing PVC resin, plasticizer, heavy calcium and other additives; heating, by a first extruder, to form a first melt, and importing the first melt into the mold to form a first layered body with a thermal shrinkage rate of 0.15%~0.2% in the main runner; wherein the above-mentioned thermal shrinkage rate may be mainly adjusted by changing the ratio of PVC to heavy calcium;
S2, mixing the PVC resin, plasticizers and other additives; heating, by a second extruder, to form a second melt, and importing the second melt into the secondary runner of the mold; applying the second melt to the base surface of the first layered body when the first layered body formed by the first melt is not completely cooled and cured, to form a second layered body with a thermal shrinkage rate of 0.7% to 0.9%, so that the first layered body and the second layered infiltrate each other at the interface to form a blended layer to obtain a substrate composed of an intermediate structure layer formed by the first layered body, an elastic stress layer formed by the second layered body, and a blended layer; wherein the coating amount of the second melt on the first layered body may be 200 $g/m^2$; and the Shore hardness may be 72 HD after the second melt is formed;
S3, coating, by a roller coater, the adhesion primer on the decorative surface of the substrate, with the coating amount of 10 $g/m^2$; and curing by UV to promote the white primer to better adhere to the substrate to prevent falling and peeling; wherein, this process adhesion primer coating amount and light energy are very important for the adhesion of the white primer to the substrate; the coating amount needs to be controlled by the roller speed of the metering roller and the distance from the coating roller, and the light intensity of the mercury lamp is controlled according to the coating amount; in this embodiment, 395 nm, 8 $W/cm^2$ UV lamp is adopted for irradiation;
S4, coating, by a roller coater, the white primer with the amount of 30 $g/m^2$ on the decorative surface of the substrate; and curing by UV, mainly as a background for flat printing, to ensure that the color of the printed area is basically the same, without obvious color difference, and make the printed pattern bright and opaque; wherein the light intensity setting may be the same as the previous step;
S5, importing the substrate into a 2D print device; importing the pattern to be printed on the 2D print device, setting the size of the plank and the height of the print head, turning on the vacuum adsorption device, LED, and UV curing lamp; wherein the required 2D plane pattern is printed on the decorative surface of the substrate obtained in the previous step; the color paste for the printed pattern may be an ultraviolet curing color paste; after the printing is completed, the pattern may be shaped by the ultraviolet curing lamp to obtain the first print substrate; the device in this step may be a 2D printing equipment purchased on the market;
S6, coating, by a roller coater, a wear-resistant layer on the SPC substrate with the 2D plane pattern after the 2D plane pattern is cured, with a wear-resistant coating amount of 50 $g/m^2$, and then curing by UV; wherein the light intensity operation setting may be the same as above;
S7, applying a third melt formed of PVC resin, plasticizer and other additives to the surface of the wear-resistant layer, so that the third melt forms a pattern simulate layer precursor on the decorative surface; wherein the composition of the third melt may be the same as the second melt, and the coating amount of the third melt may be 180 $g/m^2$;
S8, spraying, in a point-directed manner, alkaline water column selectively on the surface of the pattern simulate layer precursor according to the set printing patterns, by using 3D printing equipment; wherein after the water column are jetted to a specific area, the area may be recessed by water pressure to form a 3D surface effect; the recess area may be locally pre-cured, and the jetted water column flow may be small, so that the surface of the pattern simulate layer precursor will be heated to vaporize and evaporate after forming a 3D effect; after the 3D printing is completed, the pattern simulate layer precursor may be cooled and cured to obtain a shaped pattern simulate layer;
S9, coating 10 $g/m^2$ of UV finish coating on the surface of the pattern simulate layer, and performing photo-curing treatment to form a surface protective layer, to obtain a digital print plank.

Example 2 (Ex. 2)

A method for preparing a digital print plank may include the following steps:
S1, mixing PVC resin, plasticizer, heavy calcium and other additives; heating, by a first extruder, to form a first melt, and importing the first melt into the mold to form a first layered body with a thermal shrinkage rate of 0.15%~0.25% in the main runner;
S2, mixing the PVC resin, sarin resin, plasticizers and other additives; heating, by a second extruder, to form a second melt, and importing the second melt into the secondary runner of the mold; applying the second melt to the base surface of the first layered body when the first layered body formed by the first melt is not completely cooled and cured, to form a second layered body with a thermal shrinkage rate of 1.1% to 1.2%, so that the first layered body and the second layered infiltrate each other at the interface to form a blended layer, to obtain a substrate composed of an intermediate structure layer formed by the first layered body, an elastic stress layer formed by the second layered body, and a blended layer; wherein the coating amount of the second melt on the first layered body may be 170 g/m²; and the Shore hardness may be 75 HD after the second melt is formed;

S3, coating, by a roller coater, the adhesion primer on the decorative surface of the substrate, with the coating amount of 10 g/m²; and curing by UV to promote the white primer to better adhere to the substrate to prevent falling and peeling; wherein, this process adhesion primer coating amount and light energy are very important for the adhesion of the white primer to the substrate; the coating amount needs to be controlled by the roller speed of the metering roller and the distance from the coating roller, and the light intensity of the mercury lamp is controlled according to the coating amount; in this embodiment, 395 nm, 8 W/cm² UV lamp is adopted for irradiation;

S4, coating, by a roller coater, the white primer with the amount of 30 g/m² on the decorative surface of the substrate; and curing by UV, mainly as a background for flat printing, to ensure that the color of the printed area is basically the same, without obvious color difference, and make the printed pattern bright and opaque; wherein the light intensity setting may be the same as the previous step;

S5, importing the substrate into a 2D print device; importing the pattern to be printed on the 2D print device, setting the size of the plank and the height of the print head, turning on the vacuum adsorption device, LED, and UV curing lamp; wherein the required 2D plane pattern is printed on the decorative surface of the substrate obtained in the previous step; the color paste for the printed pattern may be an ultraviolet curing color paste; after the printing is completed, the pattern may be shaped by the ultraviolet curing lamp to obtain the first print substrate; the device in this step may be a 2D printing equipment purchased on the market;

S6, coating, by a roller coater, a wear-resistant layer on the SPC substrate with the 2D plane pattern after the 2D plane pattern is cured, with a wear-resistant coating amount of 50 g/m², and then curing by UV; wherein the light intensity operation setting may be the same as above;

S7, coating the third resin composition on the surface of the wear-resistant layer by a roller coater to form a pattern simulate layer precursor; wherein in the present embodiment, the third resin composition may mainly include acrylic acid, methacrylic acid and oligomers thereof. Among them, acrylic acid and methacrylic acid monomers can account for about 70 vol %; a small amount of other monomers or their oligomers, such as methyl methacrylate, ethyl acrylate, and the like may be allowed to be mixed; a small amount of photoinitiator may be bound to be contained; the coating amount of the third resin composition may be 180 g/m²; the UV curing equipment may be used for photo-curing treatment. In this step, the light intensity/duration may be appropriately lowered, so that the first resin layer on the surface may be not completely cured when the product passes through the equipment; for example, the light intensity can be reduced to 0.8 times the original intensity or the duration can be set to 0.8 times the original;

S8, spraying, in a point-directed manner, 3D ink selectively on the precursor of the pattern simulate layer according to the printing pattern by using 3D printing equipment; and then curing the third resin composition and 3D ink through ultraviolet light treatment; in this step, the 3D ink may be photo-cured monomer, but different from the monomer in the third resin composition; in this embodiment, the 3D ink may be mainly composed of n-butyl methacrylate, n-hexyl methacrylate and oligomers thereof; a small amount of other monomers or their oligomers, such as methyl acrylate, ethyl acrylate and butyl acrylate, can be allowed to be mixed; a small amount of photoinitiator can be contained; among them, the monomers of the n-butyl methacrylate and n-hexyl methacrylate may account for about 85 vol %;

S9, removing, by a brush roller, the cured material formed by 3D ink; in this process, the hardness of the steel brush of the brush roller needs to be adjusted to remove the cured material formed by 3D ink without causing scratches, and clean it up; thus, 3D ink is used to produce a 3D structure in the printed area to form a surface texture with a 3D effect, that is, to obtain a shaped pattern simulate layer;

S10, coating 10 g/m² of UV finish coating on the surface of the pattern simulate layer, and performing photo-curing treatment to form a surface protective layer, and then the digital print plank is obtained.

Example 3 (Ex. 3)

A method for preparing a digital print plank may include the following steps:

S1, mixing HDPE resin, wood power and other additives; heating, by a first extruder, to form a first melt; and importing the first melt into the mold to form a first layered body with a thermal shrinkage rate of 0.3%~0.4% in the main runner;

S2, melting and mixing the HDPE resin, LLDPE resin, glass fibre filler and other additives; preparing a second layered body with a thermal shrinkage rate of 1.8%~1.9% by using the second melt, cooling and shaping the second layered body for further use; and then pre-heating and importing the shaped second layered body into the base surface of the first layered body; hot-pressing the second layered body when the first layered body formed by the first melt is not completely cooled and cured, so that the first layered body and the second layered infiltrate each other at the interface to form a blended layer, to obtain a substrate composed of an intermediate structure layer formed by the first layered body, an elastic stress layer formed by the second layered body, and a blended layer; wherein the thickness of the second layered body is 0.35 mm; and the Shore hardness may be 71 HD after the second melt is formed;

S3, coating, by a roller coater, the adhesion primer on the decorative surface of the substrate, with the coating amount of 10 g/m²; and curing by UV to promote the white primer to better adhere to the substrate to prevent falling and peeling; wherein, this process adhesion primer coating amount and light energy are very important for the adhesion of the white primer to the substrate; the coating amount needs to be controlled by the roller speed of the metering roller and the distance from the coating roller, and the light intensity of the mercury lamp is controlled according to the coating amount; in this embodiment, 395 nm, 8 W/cm² UV lamp is adopted for irradiation;

S4, coating, by a roller coater, the white primer with the amount of 30 g/m² on the decorative surface of the substrate; and curing by UV, mainly as a background for flat printing, to ensure that the color of the printed area is basically the same, without obvious color difference, and make the printed pattern bright and opaque; wherein the light intensity setting may be the same as the previous step;

S5, importing the substrate into a 2D print device; importing the pattern to be printed on the 2D print device, setting the size of the plank and the height of the print head, turning on the vacuum adsorption device, LED, and UV curing lamp; wherein the required 2D plane pattern is printed on the decorative surface of the substrate obtained in the previous step; the color paste for the printed pattern may be an ultraviolet curing color paste; after the printing is completed, the pattern may be shaped by the ultraviolet curing lamp to obtain the first print substrate; the device in this step may be a 2D printing equipment purchased on the market;

S6, coating, by a roller coater, a wear-resistant layer on the SPC substrate with the 2D plane pattern after the 2D plane pattern is cured, with a wear-resistant coating amount of 50 g/m², and then curing by UV; wherein the light intensity operation setting may be the same as above;

S7, coating the third resin composition on the surface of the wear-resistant layer by a roller coater to form a pattern simulate layer precursor; wherein in the present embodiment, the third resin composition may be mainly light-curing monomer composed of methyl methacrylate and oligomers thereof. Among them, methyl methacrylate monomer can account for about 70 vol %; a small amount of other monomers or their oligomers, such as acrylic acid, methacrylic acid and oligomers thereof may be allowed to be mixed; a small amount of photoinitiator may be bound to be contained; the coating amount of the third resin composition may be 200 g/m²; the UV curing equipment may be used for photo-curing treatment. In this step, the light intensity/duration may be appropriately lowered, so that the first resin layer on the surface may be not completely cured when the product passes through the equipment; for example, the light intensity can be reduced to 0.8 times the original intensity or the duration can be set to 0.8 times the original duration;

S8, spraying, in a point-directed manner, 3D ink selectively on the precursor of the pattern simulate layer according to the printing pattern by using 3D printing equipment; wherein in the present embodiment, the temperature of 3D ink can be controlled at −5° C., and the printing volume is 10 g/m²; and then curing the third resin composition and 3D ink through ultraviolet light treatment; in this step, the 3D ink may be photocured monomer, but different from the monomer in the third resin composition; in this embodiment, the 3D ink may be mainly composed of ethyl acrylate and butyl acrylate; a small amount of other monomers or their oligomers, such as methyl acrylate, n-butyl methacrylate, n-hexyl methacrylate and oligomers thereof, can be allowed to be mixed; a small amount of photoinitiator can be contained; among them, the monomers of the ethyl acrylate and butyl acrylate monomers may account for about 85 vol %;

S9, removing, by a brush roller, the cured material formed by 3D ink; in this process, the hardness of the steel brush of the brush roller needs to be adjusted to remove the cured material formed by 3D ink without causing scratches, and clean it up; thus, 3D ink is used to produce a 3D structure in the printed area to form a surface texture with a 3D effect, that is, to obtain a shaped pattern simulate layer;

S10, coating 10 g/m² of UV finish coating on the surface of the pattern simulate layer, and performing photo-curing treatment to form a surface protective layer, and then the digital print plank is obtained.

Example 4 (Ex. 4)

A method for preparing a digital print plank may include the following steps:

S1, mixing PVC resin, wood powder and other additives; heating, by a first extruder, to form a first melt, and importing the first melt into the mold to form a first layered body with a thermal shrinkage rate of 0.15%~0.25% in the main runner;

S2, mixing the PVC resin, ABS resin and other additives; heating, by a second extruder, to form a second melt, and importing the second melt into the secondary runner of the mold; applying the second melt to the base surface of the first layered body when the first layered body formed by the first melt is not completely cooled and cured, to form a second layered body with a thermal shrinkage rate of 0.6% to 0.7%, so that the first layered body and the second layered infiltrate each other at the interface to form a blended layer, to obtain a substrate composed of an intermediate structure layer formed by the first layered body, an elastic stress layer formed by the second layered body, and a blended layer; wherein the coating amount of the second melt on the first layered body may be 200 g/m²; and the Shore hardness may be 77 HD after the second melt is formed;

S3, coating, by a roller coater, the adhesion primer on the decorative surface of the substrate, with the coating amount of 10 g/m²; and curing by UV to promote the white primer to better adhere to the substrate to prevent falling and peeling; wherein, this process adhesion primer coating amount and light energy are very important for the adhesion of the white primer to the substrate; the coating amount needs to be controlled by the roller speed of the metering roller and the distance from the coating roller, and the light intensity of the mercury lamp is controlled according to the coating amount; in this embodiment, 395 nm, 8 W/cm² UV lamp is adopted for irradiation;

S4, coating, by a roller coater, the white primer with the amount of 30 g/m² on the decorative surface of the substrate; and curing by UV, mainly as a background for flat printing, to ensure that the color of the printed area is basically the same, without obvious color difference, and make the printed pattern bright and opaque; wherein the light intensity setting may be the same as the previous step;

S5, importing the substrate into a 2D print device; importing the pattern to be printed on the 2D print device, setting the size of the plank and the height of the print head, turning on the vacuum adsorption device, LED, and UV curing lamp; wherein the required 2D plane pattern is printed on the decorative surface of the substrate obtained in the previous step; the color paste for the printed pattern may be an ultraviolet curing color paste; after the printing is completed, the pattern may be shaped by the ultraviolet curing lamp to obtain the first print substrate; the device in this step may be a 2D printing equipment purchased on the market;

S6, coating, by a roller coater, a wear-resistant layer on the SPC substrate with the 2D plane pattern after the 2D plane pattern is cured, with a wear-resistant coating amount of 50 g/m$^2$, and then curing by UV; wherein the light intensity operation setting may be the same as above;

S7, coating the third resin composition on the surface of the wear-resistant layer by a roller coater to form a pattern simulate layer precursor; wherein in the present embodiment, the third resin composition may be a photo-curable monomer composed of methyl methacrylate and its oligomers. Among them, methyl methacrylate monomer can account for about 70 vol %; a small amount of other monomers or their oligomers, such as acrylic, methacrylic, and the oligomers thereof, may be allowed to be mixed; a small amount of photoinitiator may be bound to be contained; the coating amount of the third resin composition may be 200 g/m$^2$; the UV curing equipment may be used for photo-curing treatment. In this step, the light intensity/duration may be appropriately lowered, so that the first resin layer on the surface may be not completely cured when the product passes through the equipment; for example, the light intensity can be reduced to 0.8 times the original intensity or the duration can be set to 0.8 times the original;

S8, spraying, in a point-directed manner, 3D ink selectively on the precursor of the pattern simulate layer according to the printing pattern by using 3D printing equipment; in the present embodiment, the temperature of 3D ink can be controlled at −5° C., and the printing volume can be 10 g/m$^2$; and then curing the third resin composition and 3D ink through ultraviolet light treatment; in the present embodiment, the 3D ink may be composed of a photosensitive polymerization inhibitor and solvent thereof, and its composition may be 8% of tris(N-nitroso-N-phenylhydroxylamine) aluminum salt and 92% of 2-phenol ethoxy acrylate;

S9, removing, by a brush roller, the cured material formed by 3D ink; in this process, the hardness of the steel brush of the brush roller needs to be adjusted to remove the cured material formed by 3D ink without causing scratches, and clean it up; thus, 3D ink is used to produce a 3D structure in the printed area to form a surface texture with a 3D effect, that is, to obtain a shaped pattern simulate layer;

S10, coating UV finish coating on the surface of the pattern simulate layer, and performing photo-curing treatment to form a surface protective layer, and then the digital print plank is obtained.

Comparative Example 1 (Cp. Ex. 1)

A method for preparing a digital print plank includes the following steps:

S1, mixing PVC resin, plasticizer, heavy calcium and other additives; heating, by a first extruder, to form a first melt, and importing the first melt into the mold to form a first layered body with a thermal shrinkage rate of 0.15%~0.2% in the main runner; wherein the above-mentioned thermal shrinkage rate is mainly adjusted by changing the ratio of PVC to heavy calcium;

S2, coating, by a roller coater, the adhesion primer on the decorative surface of the substrate, with the coating amount of 10 g/m$^2$; and curing by UV to promote the white primer to better adhere to the substrate to prevent falling and peeling; wherein, this process adhesion primer coating amount and light energy are very important for the adhesion of the white primer to the substrate; the coating amount needs to be controlled by the roller speed of the metering roller and the distance from the coating roller, and the light intensity of the mercury lamp is controlled according to the coating amount; in this embodiment, 395 nm, 8 W/cm$^2$ UV lamp is adopted for irradiation;

S3, coating, by a roller coater, the white primer with the amount of 30 g/m$^2$ on the decorative surface of the substrate; and curing by UV, mainly as a background for flat printing, to ensure that the color of the printed area is basically the same, without obvious color difference, and make the printed pattern bright and opaque; wherein the light intensity setting is the same as the previous step;

S4, importing the substrate into a 2D print device; importing the pattern to be printed on the 2D print device, setting the size of the plank and the height of the print head, turning on the vacuum adsorption device, LED, and UV curing lamp; wherein the required 2D plane pattern is printed on the decorative surface of the substrate obtained in the previous step; the color paste for the printed pattern may be an ultraviolet curing color paste; after the printing is completed, the pattern is shaped by the ultraviolet curing lamp to obtain the first print substrate; the device in this step is a 2D printing equipment purchased on the market;

S5, coating, by a roller coater, a wear-resistant layer on the SPC substrate with the 2D plane pattern after the 2D plane pattern is cured, with a wear-resistant coating amount of 50 g/m$^2$, and then curing by UV; wherein the light intensity operation setting may be the same as above;

S6, applying a third melt formed of PVC resin, plasticizer and other additives to the surface of the wear-resistant layer, so that the third melt forms a pattern simulate layer precursor on the decorative surface; wherein the composition of the third melt is the same as the second melt, and the coating amount of the third melt is 180 g/m$^2$;

S7, spraying, in a point-directed manner, alkaline water column selectively on the surface of the pattern simulate layer precursor according to the set printing patterns, by using 3D printing equipment; wherein, the alkaline water column has a temperature of 20° C., the water column flow rate is 0.3 mL/s, and the water pressure is 0.15 MPa; wherein after the water column are jetted to a specific area, the area is recessed by water pressure to form a 3D surface effect; the recess area is locally pre-cured, and the jetted water column flow is small, so that the surface of the pattern simulate layer precursor will be heated to vaporize and evaporate after forming a 3D effect; after the 3D printing is completed, the pattern simulate layer precursor is cooled and cured to obtain a shaped pattern simulate layer;

S8, coating 10 g/m$^2$ of UV finish coating on the surface of the pattern simulate layer, and performing photo-curing treatment to form a surface protective layer, to obtain a digital print plank.

Comparative Example 2 (Cp. Ex. 2)

A method for preparing a digital print plank includes the following steps:

S1, mixing PVC resin, heavy calcium and other additives; heating, by a first extruder, to form a first melt, and importing the first melt into the mold to form a first layered body with a thermal shrinkage rate of 0.15%~0.2% in the main runner;

S2, importing the first layered body into a 2D print device; importing the pattern to be printed on the 2D print device, setting the size of the plank and the height of the print head, turning on the vacuum adsorption device, LED, and UV curing lamp; wherein the required 2D plane pattern is printed on the decorative surface of the first layered body; the color paste for the printed pattern is an ultraviolet curing color paste; after the printing is completed, the pattern is shaped by the ultraviolet curing lamp to obtain the first print substrate; the device in this step is a 2D printing equipment purchased on the market;

S3, coating, by a roller coater, the adhesion primer on the decorative surface of the substrate, with the coating amount of 10 g/m$^2$; and curing by UV to promote the white primer to better adhere to the substrate to prevent falling and peeling; wherein, this process adhesion primer coating amount and light energy are very important for the adhesion of the white primer to the substrate; the coating amount needs to be controlled by the roller speed of the metering roller and the distance from the coating roller, and the light intensity of the mercury lamp is controlled according to the coating amount; in this embodiment, 395 nm, 8 W/cm$^2$ UV lamp is adopted for irradiation;

S4, coating, by a roller coater, the white primer with the amount of 30 g/m$^2$ on the decorative surface of the substrate; and curing by UV, mainly as a background for flat printing, to ensure that the color of the printed area is basically the same, without obvious color difference, and make the printed pattern bright and opaque; wherein the light intensity setting may be the same as the previous step;

S5, coating the third resin composition on the surface of the 2D pattern by a roller coater to form a pattern simulate layer precursor; wherein in the present embodiment, the third resin composition may mainly include acrylic, methacrylic and oligomers thereof. Among them, acrylic, methacrylic monomers can account for about 70 vol %; a small amount of other monomers or their oligomers, such as methyl methacrylate, ethyl acrylate, and the like are allowed to be mixed; a small amount of photoinitiator is bound to be contained; the coating amount of the third resin composition is 180 g/m2; the UV curing equipment may be used for photo-curing treatment. In this step, the light intensity/duration may be appropriately lowered, so that the first resin layer on the surface may be not completely cured when the product passes through the equipment; for example, the light intensity can be reduced to 0.8 times the original intensity or the duration can be set to 0.8 times the original;

S6, coating, by a roller coater, a wear-resistant layer on the SPC substrate with the 2D plane pattern after the 2D plane pattern is cured, with a wear-resistant coating amount of 50 g/m$^2$, and then curing by UV; wherein the light intensity operation setting may be the same as above;

S7, spraying, in a point-directed manner, 3D ink selectively on the precursor of the pattern simulate layer according to the printing pattern by using 3D printing equipment; and then curing the third resin composition and 3D ink through ultraviolet light treatment; in this step, the 3D ink is photo-cured monomer, but different from the monomer in the third resin composition; in this embodiment, the 3D ink is mainly composed of n-Butyl methacrylate, n-hexyl methacrylate and oligomers thereof; a small amount of other monomers or their oligomers, such as methyl acrylate, ethyl acrylate and butyl acrylate, can be allowed to be mixed; a small amount of photoinitiator can be contained; among them, the monomers of the n-butyl methacrylate and n-hexyl methacrylate account for about 85 vol %;

S8, removing, by a brush roller, the cured material formed by 3D ink; in this process, the hardness of the steel brush of the brush roller needs to be adjusted to remove the cured material formed by 3D ink without causing scratches, and clean it up; thus, 3D ink is used to produce a 3D structure in the printed area to form a surface texture with a 3D effect, that is, to obtain a shaped pattern simulate layer;

S9, coating 10 g/m$^2$ of UV finish coating on the surface of the pattern simulate layer, and performing photo-curing treatment to form a surface protective layer, and then the digital print plank is obtained.

Comparative Example 3 (Cp. Ex. 3)

A method for preparing a digital print plank includes the following steps:

S1, mixing PE resin, heavy calcium and other additives; heating, by a first extruder, to form a first melt; and importing the first melt into the mold to form a first layered body with a thermal shrinkage rate of 0.15%~0.2% in the main runner;

S2, mixing the PVC resin, plasticizer and other additives; heating and forming a second melt by a second extruder; importing the second melt into a secondary runner of the mold; applying the second melt on the base surface of the first layered body to form a second layered body with a thermal shrinkage rate of 1.1%~1.2% when the first layered body formed by the first melt is not completely cooled and cured, so that the first layered body and the second layered infiltrate each other at the interface to form a blended layer, to obtain a substrate composed of an intermediate structure layer formed by the first layered body, an elastic stress layer formed by the second layered body, and a blended layer; wherein the amount of the second melt coating on the first layered body is 170 g/m$^2$; and the Shore hardness is 72 HD after the second melt is formed;

S3, coating, by a roller coater, the adhesion primer on the decorative surface of the substrate, with the coating amount of 10 g/m$^2$; and curing by UV to promote the white primer to better adhere to the substrate to prevent falling and peeling; wherein, this process adhesion primer coating amount and light energy are very important for the adhesion of the white primer to the substrate; the coating amount needs to be controlled by the roller speed of the metering roller and the distance from the coating roller, and the light intensity of the mercury lamp is controlled according to the coating amount; in this embodiment, 395 nm, 8 W/cm$^2$ UV lamp is adopted for irradiation;

S4, coating, by a roller coater, the white primer with the amount of 30 g/m$^2$ on the decorative surface of the substrate; and curing by UV, mainly as a background for flat printing, to ensure that the color of the printed area is basically the same, without obvious color difference, and make the printed pattern bright and opaque; wherein the light intensity setting may be the same as the previous step;

S5, importing the substrate into a 2D print device; importing the pattern to be printed on the 2D print device, setting the size of the plank and the height of the print head, turning on the vacuum adsorption device, LED, and UV curing lamp; wherein the required 2D plane pattern is printed on the decorative surface of the substrate obtained in the previous step; the color paste for the printed pattern may be an ultraviolet curing color paste; after the printing is completed, the pattern is shaped by the ultraviolet curing lamp to obtain the first print substrate; the device in this step is a 2D printing equipment purchased on the market;

S6, coating the third resin composition on the surface of the surface of the 2D pattern by a roller coater to form a pattern simulate layer precursor; wherein in the present embodiment, the third resin composition may mainly contain acrylic, methacrylic and oligomers thereof. Among them, acrylic, methacrylic monomer can account for about 70 vol %; a small amount of other monomers or their oligomers, such as methyl methacrylate, ethyl acrylate and oligomers thereof, is allowed to be mixed; a small amount of photoinitiator is bound to be contained; the coating amount of the third resin composition is 180 g/m$^2$; the UV curing equipment is used for photo-curing treatment. In this step, the light intensity/duration is appropriately lowered, so that the first resin layer on the surface is not completely cured when the product passes through the equipment; for example, the light intensity can be reduced to 0.8 times the original intensity or the duration can be set to 0.8 times the original duration;

S7, coating, by a roller coater, a wear-resistant layer on the SPC substrate with the 2D plane pattern after the 2D plane pattern is cured, with a wear-resistant coating amount of 50 g/m$^2$, and then curing by UV; wherein the light intensity operation setting may be the same as above;

S8, spraying, in a point-directed manner, 3D ink selectively on the precursor of the pattern simulate layer according to the printing pattern by using 3D printing equipment; wherein in the step, the 3D ink is a photo-curable monomer, but it is different from the monomer in the third resin composition; in this embodiment, the 3D ink is mainly composed of n-butyl methacrylate, n-hexyl methacrylate and oligomers thereof; a small amount of other monomers or their oligomers, such as methyl acrylate, ethyl acrylate and butyl acrylate are allowed to be mixed; a small amount of photoinitiator may be contained; of which n-butyl methacrylate, methyl acrylate n-hexyl acrylate monomer accounts for about 85 vol %;

S9, removing, by a brush roller, the cured material formed by 3D ink; in this process, the hardness of the steel brush of the brush roller needs to be adjusted to remove the cured material formed by 3D ink without causing scratches, and clean it up; thus, 3D ink is used to produce a 3D structure in the printed area to form a surface texture with a 3D effect, that is, to obtain a shaped pattern simulate layer;

S10, coating 10 g/m$^2$ of UV finish coating on the surface of the pattern simulate layer, and performing photo-curing treatment to form a surface protective layer, and then the digital print plank is obtained.

The following experiments may be used to test the performance of the digital print planks obtained in Examples 1 to 4 and Comparative Examples 1 to 3:

Warpage detection: Take the substrates prepared in Examples 1 to 4 and Comparative Examples 1 to 3, first measure the warpage of the newly made substrates after cooling and shaping, and record it as the warpage of the finished product; then put them in an environment of 80±2° C. for 6 hours, take it out; put it in an environment of 25° C. or so for one day, take it out; and then use a feeler gauge to test the warpage of each finished product on a horizontal test bench and record it as heated warpage. The above data is recorded in Table 1;

Bending strength test: take the substrates prepared in Examples 1 to 4 and Comparative Examples 1 to 3, refer to the method in GB12626.9-1990, and use a universal material testing machine for testing;

It should be noted that the thickness and length and width of the intermediate structure layer of the substrates used in the test prepared in Examples 1 to 4 and Comparative Examples 1 to 3 are the same, and each the thickness is 5 mm.

TABLE 1

|  | Warpage of the finished product (mm/m) | Heated Warpage of the finished product (mm/m) |
| --- | --- | --- |
| Example 1 | 0.21 | 0.34 |
| Example 2 | 0.11 | 0.23 |
| Example 3 | 0.05 | 0.14 |
| Example 4 | 0.15 | 0.31 |
| Comparative Example 1 | 0.31 | 0.63 |
| Comparative Example 2 | 0.38 | 0.74 |
| Comparative Example 3 | 0.26 | 0.56 |

TABLE 2

|  | Bending Strength (Mpa) |
| --- | --- |
| Example 1 | 24.2 |
| Example 2 | 26.8 |
| Example 3 | 23.1 |
| Example 4 | 25.4 |
| Comparative Example 1 | 18.7 |
| Comparative Example 2 | 18.9 |
| Comparative Example 3 | 20.4 |

According to the results in Table 1, it can be seen that the warpage of the digital print planks prepared in Examples 1 to 4 is significantly lower than that of Comparative Example 1 and Comparative Example 2, so it can be considered that the present disclosure can achieve better anti-warping effect after compounding the elastic stress layer on the base surface of the intermediate structure layer. It is worth noting that the warpage of Comparative Example 3 is less than that of Comparative Example 1 and Comparative Example 2, but there is still a gap with Examples 1 to 4, mainly because the resin material of the elastic stress layer in Comparative Example 3 is PVC, and the resin material of the intermediate structure layer is PE. The polarity of PVC and PE is quite different. It is difficult for them to form a blended layer with a certain thickness. Therefore, the action of the elastic stress layer and the intermediate substrate layer is weak. It can be expected that, due to the presence of the blended layer, the adhesive/bonding strength between the elastic stress layer and the intermediate structure layer in Comparative Example 3 is also weaker than that of Examples 1 to 4, so it will be easier to delamination.

According to the results in Table 2, it can be seen that the static bending strength of the digital print planks prepared in Examples 1 to 4 is also higher than that of Comparative Example 1 and Comparative Example 2, mainly because the central part of the substrate will be subjected to a load when tested. The substrate will bend downwards after being loaded, and the elastic stress layer will form tension to hinder the bending during the bending process, making the final measured static bending strength greater. Although an elastic stress layer is provided in Comparative Example 3, the test results are not as good as those of Examples 1 to 4, mainly because the formation of the blended layer is not good. The tension effect of the material layer is relatively weak, and the bonding structure between the elastic stress layer and the substrate layer will be destroyed after bending to a certain extent and delamination will occur. Therefore, the maximum loading value of the substrate is lower than that of Example 1~4.

In sum, the technical solution of the present disclosure can be used to produce a digital print plank with lower warpage, and the bending strength of the substrate is better than that of the existing digital print substrate.

The specific embodiments are only explanations of the present disclosure, not a limitation of the present disclosure. After reading this specification, those skilled in the art can make modifications without inventive contribution to this embodiment as needed. All should be protected by patent law provided that they fall within the scope of the appended claims of the present disclosure.

What is claimed is:

1. A method for preparing the plank comprising the following steps:
   S1, mixing and heating a hot-melt first resin with a filler to form a first melt, and importing the first melt into a mold to form a first layered body;
   S2, transporting a prefabricated second layered body formed by a hot-melt second resin to a base surface of the first layered body, and hot-pressing on-line the first layered body and the second layered body when the first layered body formed by the first melt is not completely cooled and cured, such that the first layered body and the second layered body can infiltrate each other at an interface to form a blended layer, and the substrate composed of the intermediate structure layer formed by the first layered body, the elastic stress layer formed by the second layered body and the blended layer can be obtained;
   S3, exporting, cooling and shaping the substrate from the mold; forming, by a first print device, a pattern on a decorative surface of the intermediate structure layer to obtain a first print substrate;
   S4, applying a non-solid third resin composition to the decorative surface of the first print substrate to form a pattern simulate layer precursor; where the non-solid third resin composition is a mixed liquid containing a prepolymer that can be cross-linked to form a third resin, a monomer, and an initiator;
   S5, applying, by a second print device, a surface treating liquid to the pattern simulate layer precursor, and then curing the pattern simulate layer precursor by cooling or cross-linking polymerization to form a pattern simulate layer, and removing the surface treating liquid, such that a second print substrate with an uneven 3D pattern structure on the surface can be obtained, wherein the second print substrate is the digital print plank;
   the non-solid third resin is a photo-crosslinked resin;
   the first layered body contains fillers, and the second layered body contains no filler or less filler, so that the thermal shrinkage rate of the elastic stress layer is greater than that of the intermediate structural layer.

2. The method for preparing the digital print plank according to claim 1, wherein: the first resin is composed of one or more hot-melt resins, and the second resin is composed of one or more hot-melt resins; the first resin comprises an intermediate structure layer bonding resin, and the second resin comprises at least an elastic stress layer bonding resin that is composed of one monomer and same as the intermediate structure layer bonding resin.

3. The method for preparing the digital print plank according to claim 1, wherein: after the second print substrate is obtained in step S5, applying UV finish coating to the surface of the pattern simulate layer of the second print substrate, and photo-curing the UV finish coating to form a surface protective layer, such that the digital print plank is obtained.

* * * * *